United States Patent [19]
Schreyer et al.

[11] 3,761,580
[45] Sept. 25, 1973

[54] PROCESS FOR THE PRODUCTION OF VERY PURE, AQUEOUS HYDROGEN PEROXIDE SOLUTIONS

[75] Inventors: Gerd Schreyer; Ferdinand Theissen, both of Grossauhein; Otto Wieberg, Neu-Isenburg; Wolfgang Weigert, Offenbach, all of Germany

[73] Assignee: Deutsche Gold-und Silber-Scheideanstalt vormals Roessler, Frankfurt, Germany

[22] Filed: Aug. 24, 1971

[21] Appl. No.: 174,425

[30] Foreign Application Priority Data
Aug. 27, 1970 Germany.................. P 20 42 522.3

[52] U.S. Cl............................. 423/588, 260/369
[51] Int. Cl........................ C01b 15/02, C07c 49/68
[58] Field of Search.................... 23/207; 260/369; 159/16 R; 423/588, 589, 590, 591

[56] References Cited
UNITED STATES PATENTS
| | | |
|---|---|---|
| 2,804,376 | 8/1957 | Haller et al............................ 23/207 |
| 3,428,423 | 2/1969 | Egbert.............................. 159/16 R |
| 3,002,817 | 10/1961 | Villemey.............................. 260/369 |

Primary Examiner—Oscar R. Vertiz
Assistant Examiner—Hoke S. Miller
Attorney—Cushman, Darby & Cushman

[57] ABSTRACT

The hydrogen peroxide containing working solution in the anthraquinone process is stripped under reduced pressure with vapors of an organic solvent which is poorly miscible with water. Then the desorbate which results in condensed and extracted with water to obtain a very pure aqueous hydrogen peroxide solution.

13 Claims, 1 Drawing Figure

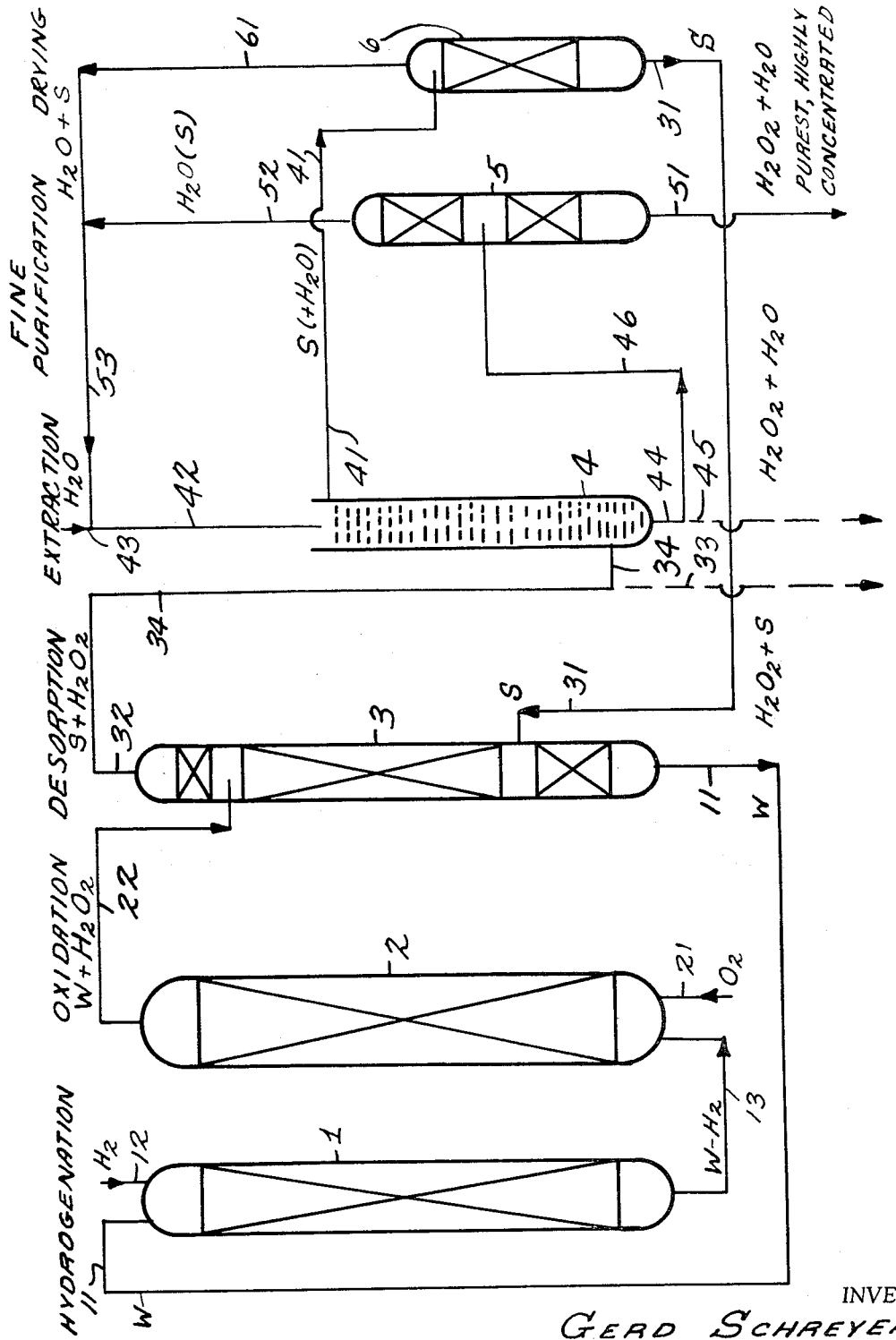

PROCESS FOR THE PRODUCTION OF VERY PURE, AQUEOUS HYDROGEN PEROXIDE SOLUTIONS

In Schreyer et al. application 856,070 filed Sept. 8, 1969 and now abandoned (corresponding to German application P 18 02 003.6) and continuation-in part thereof Schreyer et al. application 79,315 filed Oct. 8, 1970 now U.S. Pat. No. 3,707,444 (corresponding to German application P 19 51 211.9) it is proposed to separate from the working solution the hydrogen peroxide recovered by the anthraquinone process by a stripping distillation with an organic solvent under reduced pressure and thereby after subsequent condensation to recover the hydrogen peroxide in the form of nonaqueous solutions. These solutions are generally employed for further reactions in non aqueous media.

It has now been found that very pure, aqueous, high percent hydrogen peroxide solutions can be recovered in a safe and simple manner from these hydrogen peroxide solutions in organic media if the named solutions are extracted with a little water.

The amount of water is arranged according to the desired concentration of the aqueous solution which is formed. Usually 2 to 80 percent of water is added based on the weight of the organic solution.

Because of the very favorable distribution coefficients for hydrogen peroxide between water and the organic solvent the materials used as stripping agents in Schreyer et al. application 79,315 filed Oct. 8, 1970 and parent Schreyer et al. application 856,070 filed Sept. 8, 1969 (corresponding to German applications P 19 51 211.9 and P 18 02 003.6) can be employed to obtain high percentage hydrogen peroxide solutions with very little expenditure for apparatus. For the extraction generally a few exchange units are sufficient.

The entire disclosure of Schreyer et al. application Ser. No. 79,315 is hereby incorporated by reference.

Thus as stated in that application, hydrogen peroxide is produced by the anthraquinone process using a working solution of one or more alkyl anthraquinones in a high boiling solvent stable to oxygen and hydrogen peroxide. As alkyl anthraquinones, there are employed, for example, alkyl derivatives thereof, such as 2-methyl anthraquinone, 2-ethyl anthraquinone, 2-butyl anthraquinone, 2-isopropyl anthraquinone, 2-amyl anthraquinone, 2-sec. butyl anthraquinone, 2-t-butyl anthraquinone, 2-sec. amyl anthraquinone, 1,3-dimethyl anthraquinone, 2,3-dimethyl anthraquinone, 1,4-dimethyl anthraquinone, 2,7-dimethyl anthraquinone and mixtures of them, as well as their partially nuclear hydrogenated derivatives, e.g., the tetrahydro anthraquinones such as 2-ethyl tetra hydroanthraquinone. As solvents, there have been used, among others, alkyl benzenes such as tetramethyl benzene, paraffins, higher alcohols, naphthalenes such as tetralin (tetrahydronaphthalene), methyl naphthalene, dimethyl naphthalene and esters such as methyl cyclohexyl acetate, trioctyl phosphate and tributyl phosphate.

Any water insoluble oxygen and hydrogen peroxide stable solvent for the anthraquinone can be used. The solvent normally has a boiling point over 150°C.

The working solution is hydrogenated with the aid of hydrogenation catalysts such as, for example, palladium black, palladium-carrier-contact or Raney nickel whereby a more or less greater part of the anthraquinone is converted to the corresponding hydroquinone.

After separation of the hydrogenation contact catalyst the hydroquinone containing working solution is gassed in the oxidation step with air, oxygen, or with oxygen enriched air. Thereby the anthrahydroquinone is again oxidized to the anthraquinone whereby hydrogen peroxide is formed as a by-product in the solution.

The hydrogen peroxide is separated from the hydrogen peroxide containing working solutions, which have been obtained in the hydrogen peroxide production by the anthraquinone process after the oxidation step, with the help of a stripping distillation under reduced pressure and the use of vapors of organic solvents having a boiling point up to about 160°C. as the stripping agent and after condensation as a nonaqueous solution recovering in the solvent used in the stripping. Advantageously at the same time a portion of the working solution carried away by the stripping, is separated in a phase separation vessel and returned to the cycle. In contrast to the known methods of operation, there is obtained by this process directly solutions of hydrogen peroxide in the organic solvent used in the stripping.

Any of the conventional anthraquinones, alkyl anthraquinones and partially hydrogenated anthraquinones, including, but not limited to those set forth above, can be used to produce the working solution. Also there can be employed any of the high boiling solvents conventionally employed in making the working solution, including, but not limited to those set forth above.

The stripping distillation is preferably carried out at pressures between 5 and 60 Torr and temperatures between 30° and 110° C., although pressure of 3 to 100 Torr and temperatures of 20° to 120° C. can be used.

For stripping there are best suited vapors of substances which dissolve hydrogen peroxide and are not attacked by hydrogen peroxide under the process conditions. For these materials, depending on the later intended use, carboxylic acids, esters, alcohols and ethers having 4 to 10, preferably 4 to 8 carbon atoms, ketones having 3 to 7 carbon atoms, have proven suitable. Thus, there can be used carboxylic acids such as formic acid, acetic acid, propionic acid, butyric acid, isobutyric acid, pivalic acid, esters such as ethyl acetate, propyl acetate, butyl acetate, allylacetate, propyl formate, butyl formate, isobutyl acetate, t-butyl acetate, amyl acetate, isoamyl acetate, methyl propionate, ethyl propionate, methyl butyrate, ethyl butyrate, methyl valerate, methyl isovalerate, isopropyl acetate, 2-ethylbutyl acetate, sec-hexyl acetate, propyl propionate, isopropyl propionate, butyl propionate, isobutyl propionate, amyl propionate, propyl butyrate, isobutyl butyrate, methyl isobutyrate, ethyl isobutyrate, propyl isobutyrate, isopropyl isobutyrate, isobutyl isobutyrate, amyl isobutyrate, ethyl valerate, methyl isovalerate, propyl isovalerate, methyl caproate, alcohols such as propanol, butanol, isobutyl alcohol, amyl alcohol, hexyl alcohol, cyclohexanol.

An especially preferred class of stripping agents are esters of acids of the formula

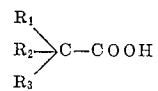

where $R_1$, $R_2$, and $R_3$ are lower alkyl, i. e., $R_1$ are alkyls with 1 to 4 carbon atoms and $R_2$ and $R_3$ alkyls with 1 to 2 carbon atoms. Thus, there can be used esters of pivalic acid, 2,2-dimethylpentanoic acid, neodecanoic acid, neotridecanoic acid, 2,2,4,4-tetramethyl valeric acid. Most preferred are lower alkyl esters of pivalic acid such as methyl pivalate, ethyl pivalate, propyl pivalate, isopropyl pivalate, butyl pivalate, sec. butyl pivalate, amyl pivalate and hexyl pivalate. There also can be used, for example, methyl neodecanoate, ethyl neodecanoate, methyl neotridecanoate.

Particularly preferred are esters of aliphatic alcohols, especially methyl to butyl alcohols with acids where $R_1$ is an alkyl group with 1-3 carbon atoms and $R_2$ and $R_3$ are alkyls of 1 to 2 carbon atoms. Most preferred are methyl to butyl esters of pivalic acid (trimethyl acetic acid). In addition to the specific esters just mentioned there can be used, for example, the methyl ester of 2,2-dimethyl valeric acid and the ethyl ester of 2,2-diethyl butyric acid.

There also can be used allyl acetate as well as esters of cycloaliphatic alcohols such as cyclohexyl acetate, cyclohexyl butyrate, cyclohexyl pivalate, cyclohexyl formate, methyl cyclohexyl acetate and cyclopentyl acetate.

Additionally there can be used as stripping agents mixtures of carboxylic acids, esters, ketones or alcohols with aromatic or aliphatic hydrocarbons or hydrocarbon fractions boiling up to 160° C. Illustrative of such a mixture is 60 percent acetic acid and 40 percent n-propyl ether.

Besides there can be used aliphatic ethers with 4-10 carbon atoms such as diethyl ether, diisopropyl ether, dibutyl ether, diisobutyl ether, di sec. butyl ether, diamyl ether, di-isoamyl ether, ethyl propyl ether, propyl butyl ether, ethylene glycol dimethyl ether, propylene glycol dimethyl ether, methyl ethyl ether of ethylene glycol, methyl ethyl ether of propylene glycol.

Also there can be used aliphatic ketones with 3-7 carbon atoms, for example acetone, methyl ethyl ketone, methyl isobutyl ketone, cyclohexanone, diisopropyl ketone.

Additional examples of mixtures of stripping agents include, for example, acetic acid-di-n-propyl ether, acetic acid-methyl ethyl ethylene glycol ether, diisopropyl ether-t-butyl acetate, di-isopropyl ether-t-butyl acetate-benzene, acetic acid-n-butyl acetate, acetone-benzene, propionic acid-propyl propionate, propyl acetate-acetic acid, propyl acetate-propanol. For example, in each of the two and three component mixtures just mentioned there can be used equal parts by volume of each component of the mixture.

The density differences between the organic hydrogen peroxide solutions using as solvents the stripping agents of said Schreyer et al. application 79,315 and water are so great that both phases are separated very quickly and without trouble and large throughputs are permitted with small columns. The distribution coefficients generally are substantially over five.

$$k = \frac{H_2O_2 - \text{weight percent in aqueous phase}}{H_2O_2 - \text{weight percent in organic solvent}}$$

Table I

| Material | $H_2O_2$-Concentration In Aqueous Phase | k |
|---|---|---|
| Ethyl pivalate | 52 weight % | 18 |
| " | 21 weight % | 35 |
| Diisopropyl ether | 47 weight % | 7.3 |
| " | 18 weight % | 12.3 |

The table shows several results from which it is evident that the distribution coefficient is not constant. In this manner there can be recovered almost any desired concentrated aqueous hydrogen peroxide solutions without further work, e.g., 50-70 weight percent and higher, e.g., up to 90 weight % and which are free from emulsifiers and practically free from solvent portions which are carried over. Because of this extraordinary purity the danger of explosion at the high percentage hydrogen peroxide solution does not appear. It was previously known to be possible to produce high percentage hydrogen peroxide solutions in a safe manner only by extraordinary industrial expense, as for example by fractional distillation in a vacuum.

The industrial advantage of the process of the invention is that without mentionable industrial expense, i.e., distillation, higher and high percentage aqueous hydrogen peroxide solutions can be recovered while excluding any danger of explosion. The very slight amounts of organic solvents carried along which, however, are far below the boundaries at which the possibility of an explosion exists can be removed by a simple topping off of a very small amount of water. In this manner high percentage hydrogen peroxide solutions of very high purity can be obtained. The carbon content is below 50 ppm. The aqueous hydrogen peroxide solutions prepared can have a hydrogen concentration of 10 to 90 percent by weight, preferably 50 to 70 percent.

By the process of the invention above all it is now possible to employ working solutions which previously could not be used for a direct extraction of hydrogen peroxide from the working solution because they had too small a density difference from water. These types of working solutions are now desorbed as shown in Scheyer et al. applications 856,070 and 79,315 (German applications P 18 02 003.6 and P 19 51 211.9) by certain organic solvents and these desorbates are then extracted with a little water. By the process of the invention the breadth of use of the anthraquinone process is substantially enlarged. Working solutions with a density of 1 or over, e.g., up to 2 can be employed directly and aqueous hydrogen peroxide solutions of almost any desired concentration recovered therefrom.

The known extraction apparatus can be used in the process of the invention, as for example counter current extraction columns with packing or plates. As packing there can be used for example glass, ceramic or metal material in the form of rings, saddles or helixes. As plates there can be used perforated plates, tunnel plates or bubble trays.

The organic hydrogen peroxide solutions, when columns are used, are fed by known distributors into the lower portion of the column and rise countercurrent to the water added above the top. The light extracted organic phase is withdrawn from the upper end of the column, the aqueous hydrogen peroxide column leaves the column at the lower end.

To produce very pure high percentage hydrogen peroxide solutions, a small amount of the aqueous hydrogen peroxide solution is distilled off, for example, in a small distillation column. The small portion distilled off contains the slight traces of organic material carried along in the crude extract. Likewise, still more highly concentrated hydrogen peroxide solutions can be prepared by further distillation of water.

An especial advantage of the process of the invention is that the energy expenditure for the production of a pure high percentage is substantially lower than in customary methods because of the elimination of the costs of distillation.

The single FIGURE of the drawings is a diagrammatic of the process of the invention.

Referring more specifically to the drawing, the working solution (W), which consists of a solution of alkyl anthraquinone and tetrahydroalkyl anthraquinone in a generally high boiling solvent mixture, is added by way of conduit 11 to the hydrogenation vessel 1 in which a portion of anthraquinone is hydrogenated to the corresponding hydroquinone with the aid of a catalyst, e.g., palladium, by hydrogen introduced over conduit 12. The partially hydrogenated working solution passes via conduit 13 to the oxidation vessel 2. Here the working solution is oxygenated by oxygen or oxygen containing gases introduced by conduit 21 whereby simultaneously hydrogen peroxide is formed. The hydrogen peroxide containing working solution flows via conduit 22 into desorption column 3 in which the hydrogen peroxide is extracted from the working solution by countercurrent flowing solvent vapors and the hydrogen peroxide accumulates as a solution in the nonaqueous solvent. The solvent (S) was introduced into the column in vapor form via conduit 31. From the head of the desorption column, customarily a small partial stream of the condensate is returned in order to eventually rinse out accompanying constituents corresponding to the vapor pressure of the working solution.

In the sump of the desorption column, the working solution is heated sufficiently that the constituents of solvent vapors injected via conduit 31 which have dissolved in it are again expelled. The cooled working solution then flows back over conduit 11 to the hydrogenation. The desorption is generally carried out at 10–100 Torr.

The hydrogen peroxide flows as a nonaqueous solution over conduit 34 into the extraction chamber 4 which is generally a packed or plate column. In this chamber the hydrogen peroxide is washed out of the organic solvent by water which is led in through conduits 43 and 42 and the hydrogen peroxide leaves the chamber via conduit 44 as a 50,60 or higher percentage aqueous solution and goes via conduit 46 into the fine purification vessel 5. Here in a small column a small amount of the water is vaporized which simultaneously removes residual traces of the solvent used that accompanied the aqueous hydrogen peroxide fed in from conduit 46.

According to the amount of water which is drawn off from the distillation over conduit 52 there is obtained as the product of the sump a highly pure and correspondingly higher concentrated aqueous hydrogen peroxide which is drawn off over conduit 51.

The hydrogen peroxide free, but moist, solvent flowing out of the upper end of the extraction chamber 4 goes over conduit 41 into the drying chamber 6 and from there is again added via conduit 31 into the desorption chamber 3. In the drying chamber 6 the water accumulated which contains solvent can be returned to the extraction chamber 4 over conduits 61, 53 and 42.

For the plant requirements for non aqueous solutions of hydrogen peroxide there can be withdrawn hydrogen peroxide via conduit 33 and the aqueous hydrogen peroxide sufficiently pure and sufficiently high concentrated for most purposes is withdrawn over conduit 45.

Unless otherwise indicated all parts and percentages are by weight.

EXAMPLE 1

A working solution which consisted of a mixture of 150 grams per liter of ethyl anthraquinone and tetrahydro ethyl anthraquinone in a solvent mixture of 40 vol percent of tributyl phosphate and 60 volume percent of a mixture of diphenyl and diphenyl oxide (density of 1) was hydrogenated and oxidized to such an extent that it contained 12 grams of hydrogen peroxide per liter. This solution was sent to the upper portion of a desorption column having a temperature of 68°C at 30 Torr and therein desorbed countercurrently with so much n-butyl acetate vapor that after condensation the butyl acetate-hydrogen peroxide vapors consisted of a 20 percent hydrogen peroxide solution. 1/5 of the condensate was furnished as return to the head of the column. The sump product leaving the column at 115°C. was practically free of butyl acetate and hydrogen peroxide and could be returned again to the cyclic process.

The solution of hydrogen peroxide in butyl acetate was extracted with sufficient water that a 50 percent aqueous hydrogen peroxide solution was drawn off from the bottom of the extraction column used. Hydrogen peroxide free butyl acetate left the head of the column and after drying was again used for desorption. The 50 percent hydrogen peroxide solution was sent to the middle of a short Raschig ring filled distillation column (pressure = 50 Torr) and sufficient water distilled off together with traces of butyl acetate from the head of the column that the sump product drawn off was a 60 percent hydrogen peroxide solution which contained less than 10 ppm of carbon.

EXAMPLE 2

In the same manner as in the example 1 a hydrogenated and oxidized working solution which contained 12.5 grams per liter of hydrogen peroxide was desorbed with sufficient ethyl pivalate that after the condensation there resulted a 17 percent hydrogen peroxide solution in ethyl pivalate. The ethyl pivalate free sump product leaving the desorption column contained only traces of hydrogen peroxide and could again be returned to the cyclic process.

The desorbate was subsequently extracted with sufficient water that a 52 percent aqueous hydrogen peroxide solution accumulated resulted out of the lower part of the extraction column which was concentrated to 62 percent at 40 Torr in the mentioned distillation column by distilling off the water together with the traces of ethyl pivalate present. The ethyl pivalate leaving the upper part of the extraction column was free of hydrogen peroxide and after azeotropic removal of water could again be used for the desorption.

What is claimed is:

1. A process for the production of very pure aqueous, highly concentrated hydrogen peroxide by the anthraquinone process comprising reducing with hydrogen an alkyl anthraquinone in a working solution, then oxidizing the reduced solution, stripping hydrogen peroxide from the working solution under reduced pressure after the oxidation step of the anthraquinone process using as the stripping agent vapors of an organic solvent for hydrogen peroxide which solvent is poorly miscible with water and which is an ester of a carboxylic acid or an ether, condensing the resulting vapors containing hydrogen peroxide and extracting the condensed vapors to give an aqueous hydrogen peroxide solution of the desired concentration.

2. A process according to claim 1 wherein there is employed sufficient water in the extraction to give aqueous hydrogen peroxide having a concentration of 10 to 90 percent.

3. A process according to claim 2 wherein there is employed sufficient water to give aqueous hydrogen peroxide having a concentration of 50 to 70 percent.

4. A process according to claim 1 wherein the organic stripping agent is one in which the distribution coefficient for hydrogen peroxide between water and the stripping agent is at least five.

5. A process according to claim 4 wherein the stripping agent is an alkyl ester of an alkanoic acid having 1 to 5 carbon atoms or an aliphatic ether having 4 to 10 carbon atoms.

6. A process according to claim 5 wherein the stripping agent is a 1 to 4 carbon atom alkyl ester of pivalic acid.

7. A process according to claim 5 wherein the stripping agent is an alkyl ester of a straight chain alkanoic acid having 1 to 6 carbon atoms and an alkanol having 1 to 6 carbon atoms.

8. A process according to claim 1 wherein a portion of the aqueous hydrogen peroxide solution is distilled off to remove residual traces of stripping agent from the main portion of aqueous hydrogen peroxide.

9. A process according to claim 8 wherein the distillation of the aqueous hydrogen peroxide is carried out until the residual carbon content in the residual aqueous hydrogen peroxide is below 50 ppm.

10. A process according to claim 9 including the step of further concentrating the residual hydrogen peroxide from an initial value of 50 to 70 percent to 51 to 90 percent.

11. A process according to claim 1 wherein the desorption is carried out at 10 to 100 Torr.

12. A process according to claim 1, wherein the water used for extraction is 2 to 80 percent of the weight of the desorbate condensed vapors.

13. A process according to claim 1, wherein there is employed sufficient water in the extraction to give aqueous hydrogen peroxide having a concentration of 50 to 90 percent.

* * * * *